Sept. 19, 1933.  S. L. MARSH  1,927,410
OIL RECLAIMER
Filed June 9, 1930  2 Sheets-Sheet 1

Inventor
Samuel L. Marsh
By Bates, Goluck & Peace
Attorneys

Sept. 19, 1933.  S. L. MARSH  1,927,410
OIL RECLAIMER
Filed June 9, 1930  2 Sheets-Sheet 2

Inventor
Samuel L. Marsh
By Bates, Tofick & Teare
Attorneys

Patented Sept. 19, 1933

1,927,410

UNITED STATES PATENT OFFICE 1,927,410

OIL RECLAIMER

Samuel L. Marsh, New York, N. Y.

Application June 9, 1930. Serial No. 459,928

4 Claims. (Cl. 210—57)

This invention relates to improvements in oil reclaimers or separators adaptable for use in the recovery of oils and greases from waste waters, and is concerned specifically with improvements of oil reclaimers of the type generally disclosed in my prior patent issued June 3, 1924, No. 1,496,160.

The general object of my invention is the provision of an oil separator or reclaimer adaptable to the purpose of removing oil from waste waters, whereby the oil is prevented from accumulating in drain lines and difficulties of gas accumulation and clogged drain lines prevented.

A further object of my invention is the provision of an oil reclaimer which is adapted to separate grease and oil matters from waste waters, whereby such oily matters may be reclaimed.

A still further object of my invention is the provision of an oil and grease reclaimer which, while separating oil and grease from waste waters, will also function to separate various solids carried by the waters discharged into the separator, whereby the ingress of such solids to the drain lines is prevented.

Other objects and novel features of construction of my invention will become apparent from the following description of the accompanying drawings and the novel characteristics thereof are set forth in the claims.

Figure 1:
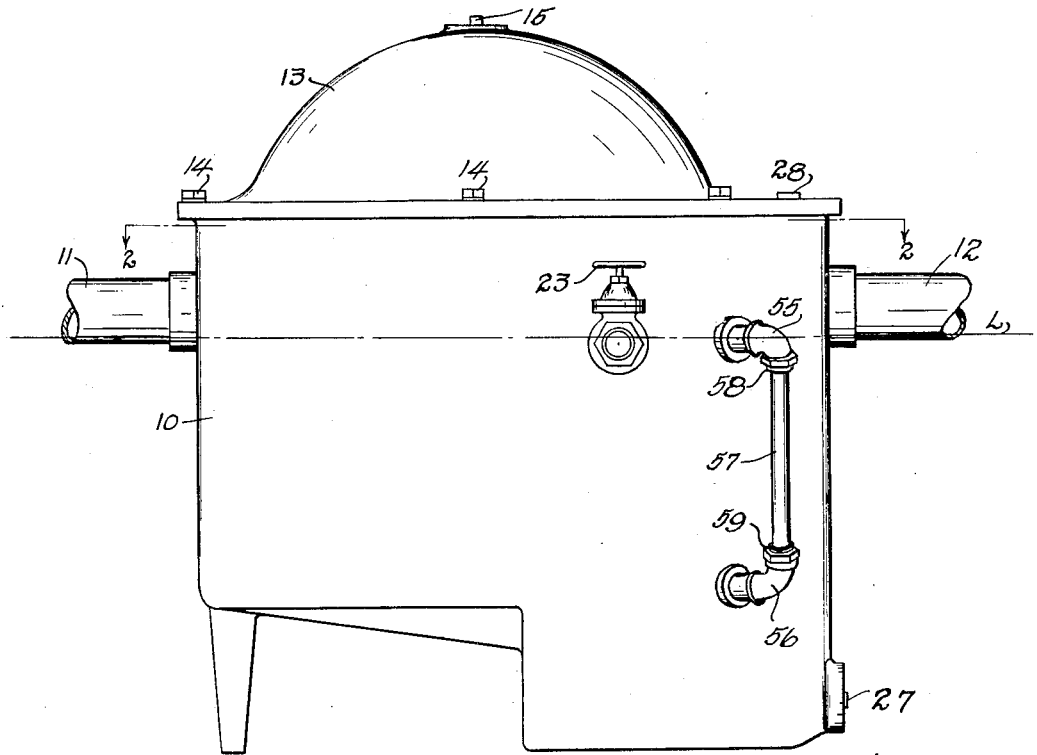
Figure 2:
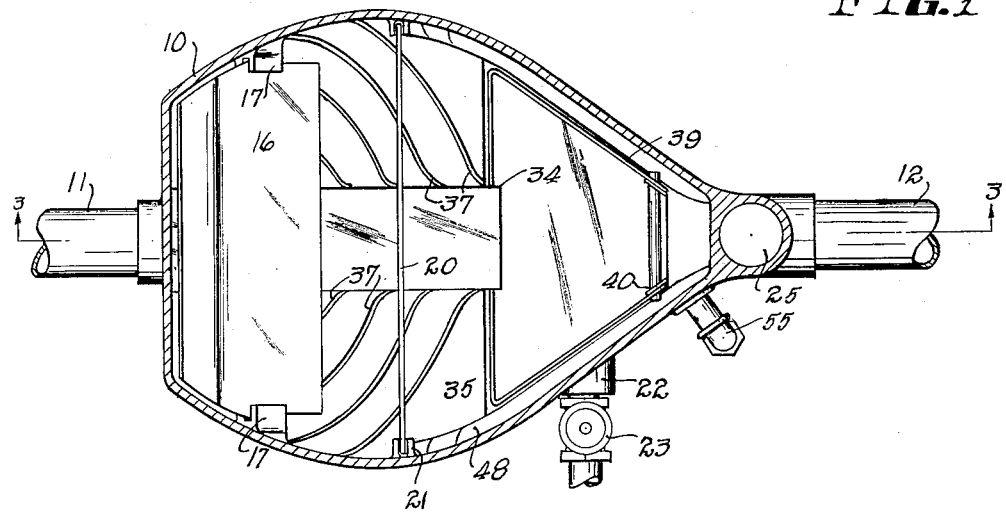
Figure 3:
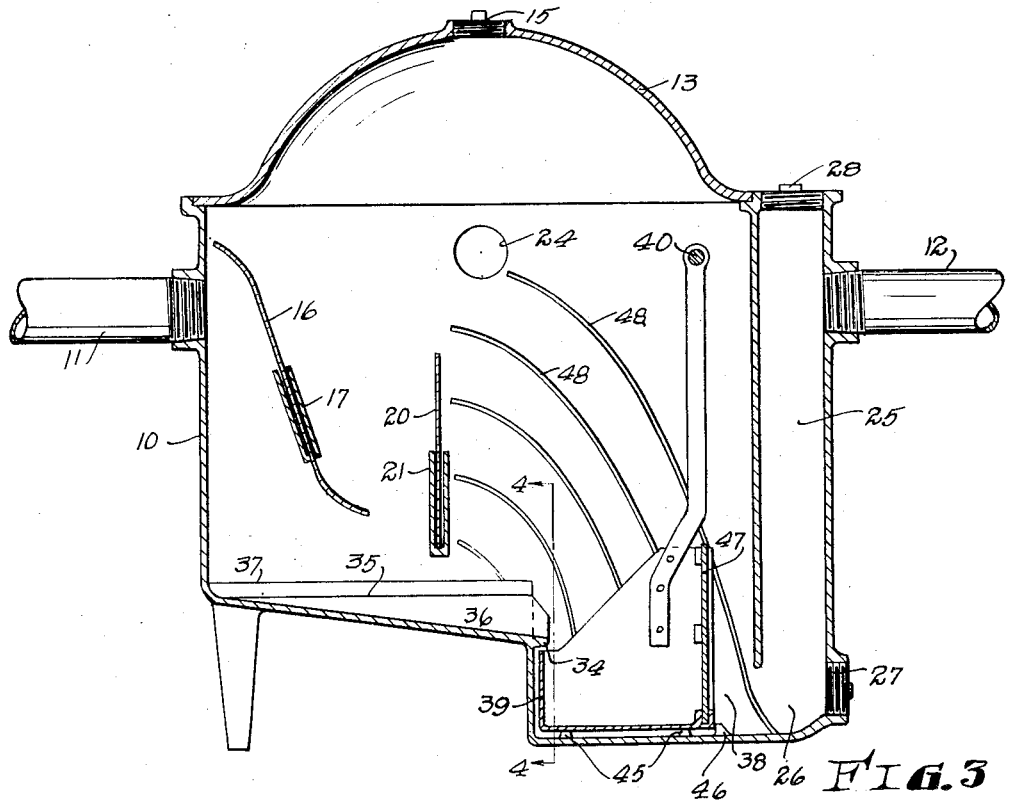
Figure 4:
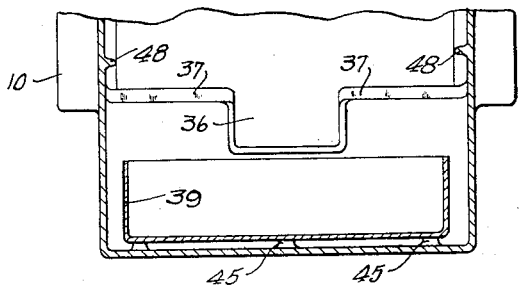

In the drawings, Fig. 1 is a side elevation of an oil and grease reclaimer embodying the features of my invention; Fig. 2 is a cross sectional plan view of the oil reclaimer taken substantially along the line 2—2 of Fig. 1; Fig. 3 is a cross sectional side elevation of the reclaimer taken substantially along the line 3—3 of Fig. 2 and Fig. 4 is a cross sectional detail of part of the apparatus taken substantially along the line 4—4 of Fig. 3.

My present invention contemplates the embodiment of certain novel improvements in an oil reclaimer of the general structure of the device shown in my prior Patent No. 1,496,160, hereinbefore referred to, and the device embodies a re-arrangement of the bottom structure, whereby a certain relationship of the baffles may be obtained to decrease the velocity of the incoming waste water being discharged thereinto, while obtaining a maximum amount of agitation of the water under decreased velocity, whereby a general upward movement of the oils and greases to be reclaimed is obtained, while a general downward movement of the heavier sediments is directed into a sediment receiving receptacle disposed within the separator receptacle at a position adjacent the outlet end of the separator. Devices of the general type with which the present invention is concerned, embody the operative principle of decreasing the velocity of the incoming water to thereby permit the rise of the light gravity matters to be reclaimed or to be prevented from being discharged into drain or sewer lines and more or less restricted outlets, whereby the velocity of the water being discharged into the drain line is increased to carry into the drain line whatever solids might precipitate to the bottom of the separator during the action of the separator, causing the light specific gravity matters to rise to the top thereof. This action is generally effected by having the receptacle formed in such a manner as to have a relatively great volumetric capacity at one end to decrease the velocity of the incoming stream, and of decreased or restricted volumetric capacity at the discharge end to increase the velocity of the liquid being discharged from the receptacle. However, my present invention is directed to the retention of these solids heretofore discharged into the drain line, and I accomplish the same by a certain novel relationship of bottom structure, solids receptacle structure, and flow channels, whereby I maintain the separating efficiency of the device while assuring the prevention of the discharge of solids from the separator to the drain line, and this bottom construction comprises generally an upper and lower bottom wall, the upper wall being adjacent the inlet end of the separator although a substantial distance below the inlet, while the lower bottom wall is adjacent the outlet end of the separator. The upper wall is constructed, as will be hereinafter described in detail, in such a manner as to direct the precipitated solids to the solids receptacle and the relation of the solids receptacle to the outlet duct of the separator is such as to form an additional completely submerged baffle for the trapping of the solids.

Referring to the drawings, the oil reclaimer is shown as comprising the major receptacle 10, preferably formed of a single casting unit, having an inlet branch and connection 11, through which the incoming liquid passes into the interior of the receptacle. An outlet connection 12 is provided at the opposite end of the receptacle at substantially the same level as the inlet 11, the outlet leading to the drain or sewage line. It will be noted that the receptacle is wider at the inlet than at the outlet end and that the side walls bend outwardly to gradually increase the cross-section of the receptacle from the inlet to the midregion, and then curve inwardly to decrease the cross-section from the mid-region to the outlet end. The major portion of the receptacle, it will be observed, is disposed beneath the inlet and outlet lines, and the receptacle is provided with a cover 13, which may be secured in place by any suitable means, preferably by bolts 14, and the cover may be provided with an inspection plug 15, if desired.

Disposed within the receptacle chamber, immediately adjacent and across the inlet opening is a removable curved baffle member 16 of such form as to retard and change the direction of flow of the incoming stream downwardly toward the upper bottom wall 35 of the receptacle. This baffle plate may be suspended in the desired position by means of supporting ribs 17 formed integrally on the side walls of the receptacle. A second baffle member 20 is similarly supported by ribs 21 to extend slightly below the bottom edge of the first baffle member 16 and extends vertically and terminates slightly below the normal liquid level of the separator, the lower edge of the baffle plate 20 terminating above the upper bottom wall 35. This second baffle member is slightly spaced from the lower end of the first baffle and at substantially the widest part of the receptacle where it functions to cause further agitation of the incoming liquid while the same is moving at a considerably decreased velocity relative to the velocity of the liquid as it is discharged into the receptacle chamber.

The normal liquid line is shown by the dot and dash line L. An oil outlet line 22 having an ordinary type valve 23 is placed on one side of the receptacle, substantially on the normal water line. In order to prevent siphonic action when oil is withdrawn through the oil outlet 22, an air vent 24 is provided. It will be understood that this air vent may be placed anywhere in the receptacle or cover above the highest level reached by the water.

In order to remove the water which has been separated from the oil without disturbing the quiescent body of oil floating on top of the water, as well as to guard against the removal of any of the oil, an outlet duct 25 is provided, which leads from the outlet to an opening 26 at the bottom of the receptacle. For cleaning this outlet duct should it become clogged, two cleanout plugs 27 and 28, respectively, are placed at either end.

The bottom of the receptacle is of such form as to have two elevations relative to the normal liquid line of the receptacle chamber, and as shown in Fig. 3 the upper bottom portion 35 extends beneath the baffle members 16 and 20, termination substantially midway of the receptacle chamber, and is provided with a centrally located inclined channel 36 tapering from the inlet end to a solids receptacle bucket 39, the remainder of the bottom wall being formed in stepped-down fashion to provide a space for the bucket at sufficiently low level, whereby sediment disposed on the bottom wall 35 and in the channel 36 will be discharged over the side and into the bucket.

Projecting upwardly from the bottom 35, (and formed integrally with the upper bottom wall of the receptacle) are a plurality of curved ribs 37, adapted to guide any sediment which falls on the upper bottom wall 35 into the channel 36. The channel 36 is provided with a lip 34, which extends out over a depression formed in the remainder of the bottom of the receptacle. This depression, designated at 38, is for the reception of a solids bucket 39. The solids bucket conforms, as shown in Fig. 2, to the shape of the depression in the receptacle, and substantially fills the whole of the same. The bucket is provided with a suitable handle 40 for the easy removal of the same when the cover 13 is removed. The bottom of the depression 38 is provided with a plurality of feet 45 upon which the bucket 39 rests. The feet allow water to flow under the bucket and thus prevent any suction action, which might be caused by the weight of the sediment within the bucket. A stop lock 46 is also provided on the bottom of the depression to prevent the bucket slipping on the bottom and moving away from the channel 36. The stop lock is so placed that the bucket, when in its proper position, will lie under the lip 34, so that any sediment which is too heavy to be carried by the fluid, will drop off the lip directly into the bucket. In order to catch the smaller particles of sediment, I provide the bucket with a removable back baffle 47. As seen from Fig. 3, this extends substantially higher than the forward end of the bucket which causes an upward flow of the water discharged from the central channel 36, and, as all of the water does not immediately pass behind the baffle 47 and out the opening 26, an eddy is created between the end of channel 36 and baffle 47. 48 indicates a series of curved ribs of varying length, inwardly projecting from the wall of the receptacle for guiding any lighter particles of sediment into the solids bucket 39.

In order to determine the position of the line separating oil and water, I provide a gauge comprising two elbows 55 and 56, respectively, and connected by a glass tube 57, the glass tube 57 being fitted to the elbows 55 and 56 by suitable packing nuts 58 and 59 respectively. The elbow 55 is placed substantially on the water line, and, of course, communicates through an opening with the inside of the receptacle. The elbow 56 is placed somewhere near the bottom of the receptacle. It is essential to have the bottom of the opening leading to the elbow 55 slightly lower than the bottom of the oil outlet 22, for otherwise there would be no means of oil getting into the gauge, and it would be impossible to thereby show the line between oil and water.

In operation the mixture of oil, water, sand and other impurities, enters the receptacle at the inlet 11 under pressure or gravity. The oil comes in contact with the baffle 16, which, because of its inclination obliquely to its direction of flow, abruptly changes the direction of flow of the mixture without emulsification. This change of direction disturbs the equilibrium of the component of the oil mixture, whereupon the oil particles force their way upwardly, whereas the water, sand and other impurities pass down to the bottom 35, the water washing most of the sand and sediments into the channel 36, and then into the bucket 39. As has been explained a quiescent body of oil collects above the downflow of water and beneath this quiescent body I desire to make the liquid therebelow turbulent, or to produce eddies therein. The turbulence or eddies are produced by the impact of the mixture against the baffles 20 and 47, the curved sides of the receptacle, and the ribs 48 and 37. The turbulence or eddies not only serve to facilitate the separation and flotation of the oil particulars upwardly into the quiescent body, but apparently slightly cleanse the oil particles from any impurities which tend to stick thereto. As the oil accumulates in a quiescent mass in the upper part of the receptacle, it overflows by force of gravity through the overflow pipe outlet 22, when the valve 23 is open.

It will thus be seen that I have devised a very simple apparatus for removing sediments and other impurities from oil as it comes from wells, garages, bilge waters from ships, etc., wherein the oil can be drawn off continuously and efficiently, with no danger whatever of the reclaimer becoming clogged.

I claim:

1. An oil reclaimer, comprising a receptacle having an inlet, an outlet for water, an outlet for oil, and a solids bucket at the bottom of said receptacle near the water outlet, the side wall of said bucket nearer the water outlet extending higher than the side wall of the bucket nearer the inlet and serving to form an auxiliary passageway leading to the outlet passageway.

2. In an oil separator, the combination of a receptacle relatively wide at one end and narrow at the other end, a liquid inlet leading into the receptacle at the wide end thereof, an outlet formed at the opposite end of the receptacle, the wide end of the receptacle being provided with a flat bottom having a sloping channel therein, the narrow end of the receptacle being provided with a stepped-down bottom formation, a sediment box disposed in said stepped-down formation, to receive sediment discharged from the channel, said sediment box having an end wall thereof disposed adjacent an outlet duct formed at the narrow end of the receptacle to thus form a downward flow channel communicating with the outlet duct.

3. In an oil reclaimer, the combination of a receptacle, relatively wide at one end and narrow at the other end, a liquid inlet leading into the receptacle at the wide end thereof, a water outlet formed at the opposite ends of the receptacle, means for removing oil, the wide end of the receptacle being provided with a horizontal flat bottom, having a sloping channel therein; the horizontal flat bottom also having a plurality of ribs associated therewith, said ribs being adapted to conduct all heavy sediments into said channel, the narrow end of the receptacle being provided with a stepped-down bottom formation, said channel extending out into the stepped-down bottom formation, a sediment box disposed in said stepped-down bottom formation, a part of said sediment box lying under the extended portion of said sloping channel, whereby all of the sediment flowing down the channel is deposited in the sediment box.

4. In an oil separator, the combination of a receptacle relatively wide at one end and narrow at the other end, a liquid inlet leading into the receptacle at the wide end thereof, an outlet formed at the opposite end of the receptacle near the bottom thereof, the wide end of the receptacle being provided with a flat bottom, the narrow end of the receptacle being provided with a stepped-down bottom formation, a sediment box disposed in said stepped-down formation, a portion of the flat bottom overhanging the sediment box to discharge solids thereinto, there being a baffle on the side of said box toward the outlet to prevent solids in the box from being carried out of the receptacle.

SAMUEL L. MARSH.